(12) United States Patent
Heibler et al.

(10) Patent No.: US 7,140,913 B2
(45) Date of Patent: Nov. 28, 2006

(54) APPARATUS FOR CONNECTION OF A COAXIAL CABLE TO A HOUSING

(75) Inventors: Wolfgang Heibler, Ostermunchen (DE); Stefan Berger, Rohrdorf (DE)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 11/113,071

(22) Filed: Apr. 25, 2005

(65) Prior Publication Data
US 2006/0051983 A1    Mar. 9, 2006

(30) Foreign Application Priority Data
Sep. 8, 2004   (DE) .................... 10 2004 043 518

(51) Int. Cl.
*H01R 9/05* (2006.01)
(52) U.S. Cl. ..................................... 439/578
(58) Field of Classification Search ............ 439/95, 439/96, 98, 578, 581, 584; 174/35 C
See application file for complete search history.

(56) References Cited

U.S. PATENT DOCUMENTS

| | | | | |
|---|---|---|---|---|
| 4,447,107 | A | * | 5/1984 | Major et al. ............... 439/584 |
| 4,624,525 | A | * | 11/1986 | Ichimura et al. ............ 439/596 |
| 5,315,684 | A | * | 5/1994 | Szegda .................... 385/139 |
| 6,089,912 | A | * | 7/2000 | Tallis et al. ............... 439/584 |
| 6,231,374 | B1 | | 5/2001 | Kuo |
| 6,376,766 | B1 | * | 4/2002 | Bartholoma et al. ........ 174/354 |

FOREIGN PATENT DOCUMENTS

| | | |
|---|---|---|
| DE | 3127867 C2 | 8/1983 |
| DE | 3308383 C2 | 9/1984 |
| DE | 9113660.1 | 3/1992 |
| DE | 9201594.8 | 5/1992 |
| DE | 4130603 A1 | 3/1993 |
| DE | 92 16 192.8 | 5/1993 |
| DE | 19701959 C1 | 8/1998 |
| DE | 29719337 U1 | 4/1999 |
| DE | 198 24 808 C1 | 9/1999 |
| DE | 19908455 C2 | 9/2000 |
| DE | 20114345 U1 | 2/2003 |
| DE | 102 59 803 B3 | 5/2004 |

* cited by examiner

*Primary Examiner*—Chandrika Prasad
(74) *Attorney, Agent, or Firm*—Nixon & Vanderhye P.C.

(57) ABSTRACT

A housing has a integral coaxial cable connector including a holder for a coupling element. The coupling element has an insertion opening into which a connecting element, in which a coaxial cable is positioned, can be inserted in a direction which is essentially at right angles to the axial axis of the connecting element. The connecting element and the holder for the coupling element are shaped such that a connecting element which has been inserted into the holder touches one or more contact points in the holder in order to make a conductive contact. The coupling element has a clamping device by means of which the connecting element can be detachably firmly clamped in a clamping position in the holder. The clamping device on the insertion opening exerts pressure on the connecting element in the clamping position, and thus presses the connecting element against the one or more contact points.

16 Claims, 9 Drawing Sheets

APPARATUS FOR CONNECTION OF A COAXIAL CABLE TO A HOUSING

The invention relates to an apparatus for connection of a coaxial cable, in particular of an antenna coaxial cable, to a housing.

A large number of connecting apparatuses for attachment of a coaxial cable, in particular of the outer conductor of a coaxial cable, to a metallic housing are known from the prior art. For example, the document DE 102 59 803 B3 discloses an electrical connection in which a stepped plug element with knurling is pressed into a retaining opening in a housing.

The document DE 92 16 192 U1 discloses a coaxial connector in which a plug which is attached to a coaxial conductor is connected to a shielding plate. For this purpose, a contact sleeve with spring fingers is positioned on the plug, and is clamped in the shielding plate via a shielding sleeve.

The document DE 198 24 808 C1 discloses a holder for a coaxial cable, in which a coaxial outer conductor is connected to a connecting element in the form of a clamping sleeve, with the clamping sleeve having projections which in turn make contact with a holder in a wall.

In the connecting apparatuses according to the prior art, it has been found to be disadvantageous that the coaxial cable must essentially be inserted in the axial direction in order to make contact with the outer conductor, so that damage can occur to the inner conductor during insertion into the connecting apparatus.

It is also known from the prior art for the outer conductor of a coaxial cable to be soldered to a connection element, with this connection element in turn being screwed directly to a housing. One problem in this case is that the current flow on one side from the outer conductor via the screw connection point results in loss of the coaxial principle. Furthermore, the electrical contact may be undefined owing to seating processes in the screw connection.

The object of the invention is therefore to provide a connecting apparatus for a coaxial cable to a housing, which allows contact to be made between the coaxial outer conductor and the housing reliably and simply.

This object is achieved by the independent patent claims. Developments of the invention are defined in the dependent claims.

The apparatus according to the invention has a connecting element with an axial axis, in which case a coaxial cable can be inserted into the connecting element and can be conductively connected to the outer conductor of the coaxial cable. In this case, the axial axis of the connecting element corresponds essentially to the axial axis of the inserted coaxial cable, or is parallel to it. Alternatively, the connecting element forms a part of the outer conductor of the coaxial cable. Furthermore, a coupling element is provided, which can be conductively connected to the housing or is formed integrally with the housing, and has a holder into which the connecting element can be inserted. In the apparatus according to the invention, the holder has an insertion opening into which the connecting element can be inserted in a direction which is essentially at right angles to the axial axis of the connecting element. Furthermore, the connecting element and the holder for the coupling element are shaped such that a connecting element which has been inserted into the holder touches one or more predetermined contact points in the holder in order to make a conductive contact. The coupling element furthermore has a clamping device by means of which the connecting element can be detachably firmly clamped in a clamping position in the holder, with the clamping device on the insertion opening exerting pressure on the connecting element in the clamping position, and thus pressing the connecting element against the one or more contact points.

The apparatus according to the invention has a number of advantages. The defined contact points result in a clearly defined current flow from the outer conductor to the housing. Furthermore, the connecting element and the coaxial cable connected to it can easily be assembled since the coaxial cable can be inserted in a direction at right angles to the axial axis of the cable. In particular, this avoids damage to the inner conductor. Furthermore, the connecting element is pressed automatically by means of the clamping device onto the contact points in the coupling element, thus ensuring a more accurate and defined conductive contact with the housing.

In one preferred embodiment, a number of contact points, in particular four, are provided, with some of the contact points being offset with respect to the other contact points in the axial direction of the connecting element. In particular, in this case, some of the contact points are located on the inside of the housing, and the other contact points are located on the outside of the housing. This means that the outer conductor current, which is flowing on the outside of the outer conductor, flows away via the contact points on the outside of the housing while, in contrast, the outer conductor current which is flowing on the inside of the outer conductor flows away via the contact points on the inside of the housing.

In a further variant of the invention, the contact points are arranged symmetrically about an axis of symmetry which corresponds to the direction in which the connecting element is inserted into the insertion opening in the coupling element. In particular, seen in the axial direction of the connecting element, the contact points are offset with respect to one another through an angle of between 90° and 120°. Furthermore, the contact points may form one or more contact point pairs, with each contact point pair comprising two contact points, which are aligned with respect to one another in the axial direction of the connecting element.

In one preferred embodiment, the connecting element is a connecting sleeve with a circumferential profiled groove, which interacts with one or more flat elements in the holder such that the one or more contact points are touching points between the flat elements and the profiled groove. In particular, the profiled groove is in the form of a wedge, with the conical flanks of the profiled groove resting on correspondingly arranged cylindrical surfaces in the cutout. This means that the axial attachment position of the connecting element in the holder is fixed in a simple manner by means of an interlock. The conical flanks of the profiled groove are in this case preferably inclined at an angle of +30° and/or −30° to the axial axis of the sleeve. In one particular preferred variant, the cylindrical surfaces are flat sections on one or more cylinders which are inclined with respect to the axis in whose direction the connecting element is inserted into the insertion opening in particular at an angle of +45° and/or −45°, with the axis of the cylinder or cylinders lying on a plane at right angles to the axial axis of the sleeve. Furthermore, the holder may have two opposite projections, which engage in the wedge-shaped profiled groove in the connecting element.

In an alternative refinement of the apparatus according to the invention, the connecting element is a connecting sleeve with a circumferential profiled ring, which interacts with one or more notches in the holder such that the contact point or points are points at which the notches touch the profiled ring.

Once again, this refinement results in the connecting sleeve being fixed axially in the holder in a simple manner.

In a further refinement, the holder is a cutout formed between two flange sections, with a clamping bar which extends over the cutout being detachably attached to the flange sections and pressing at least indirectly on the connecting element. In particular, the clamping bar presses on the connecting element at one or more contact points, preferably at two contact points. In this case, the clamping bar is preferably screwed to at least one of the flange sections. The use of a clamping bar makes sure that the connecting element can be fitted in the holder easily, in particular using a conventional screwdriver.

In a further variant, the clamping bar can be mounted on the coupling element in advance such that it can be pivoted at one end about an axial axis of a flange section into a stop position, in which case the clamping bar can be fixed in the stop position in order to produce the clamping effect. An engagement section, which is arranged at the opposite end of the clamping bar, preferably makes contact with the other flange section in the stop position, although it is also possible for the clamping bar to be fixed in some other way without the opposite end of the clamping bar touching the other flange section. Installation of the clamping bar in advance ensures, in a simple manner, that the clamping bar is arranged in a position in which the bar is fixed for clamping. In particular, the clamping bar has a hole with a closed edge at one end, into which hole a first threaded bolt is inserted for screwing to one flange section, with the engagement section being a hole which is arranged at the opposite end of the clamping bar and is open to the edge of the clamping bar, such that a pivoting movement of the clamping bar allows the opened hole to be positioned on a second threaded bolt for screwing to the other flange section, with the clamping effect being produced by tightening the two threaded bolts.

The clamping bar preferably has a projection by means of which it can be rotated by a user's finger. In one preferred variant, the clamping bar presses directly on the connecting element in order to produce the clamping effect. However, it is also possible for the clamping bar to press on one or more clamping jaws in the holder in order to produce the clamping effect, with the clamping jaws making contact with the connecting element at one or more contact points.

The clamping bar can preferably be elastically deformed in order to produce the clamping effect, with this deformation capability allowing good compensation for tolerances and compensating for all the changes in the contact conditions, in particular changes caused by seating and thermal expansion. This ensures that the contact forces are always high.

The clamping bar is preferably composed of a non-conductive material, in particular of glass fiber reinforced plastic. However, it is also feasible for the clamping bar to be composed of metal, preferably of spring bronze. In this case, further electrical contact points are created in the holder in addition to the already existing contact points. Furthermore, the clamping bar can be isolated from the flange sections and/or from the connecting element.

The connecting element may be a metallic turned part, which is simple to manufacture. In particular, the coupling element is formed integrally with the housing, in the form of a casting. Furthermore, the outer conductor of the coaxial cable is preferably soldered in the connecting element.

In addition to the connecting apparatus described above, the invention also relates to a housing, in particular to a housing for a phase shifter for an antenna arrangement, which has the connecting apparatus according to the invention. In this case, the contact points of the connecting apparatus are preferably arranged such that some of the contact points are located adjacent to the inside of the housing, and the other contact points are located adjacent to the outside of the housing.

Exemplary embodiments of the invention will be described in detail in the following text with reference to the attached figures, in which.

Figure 1:
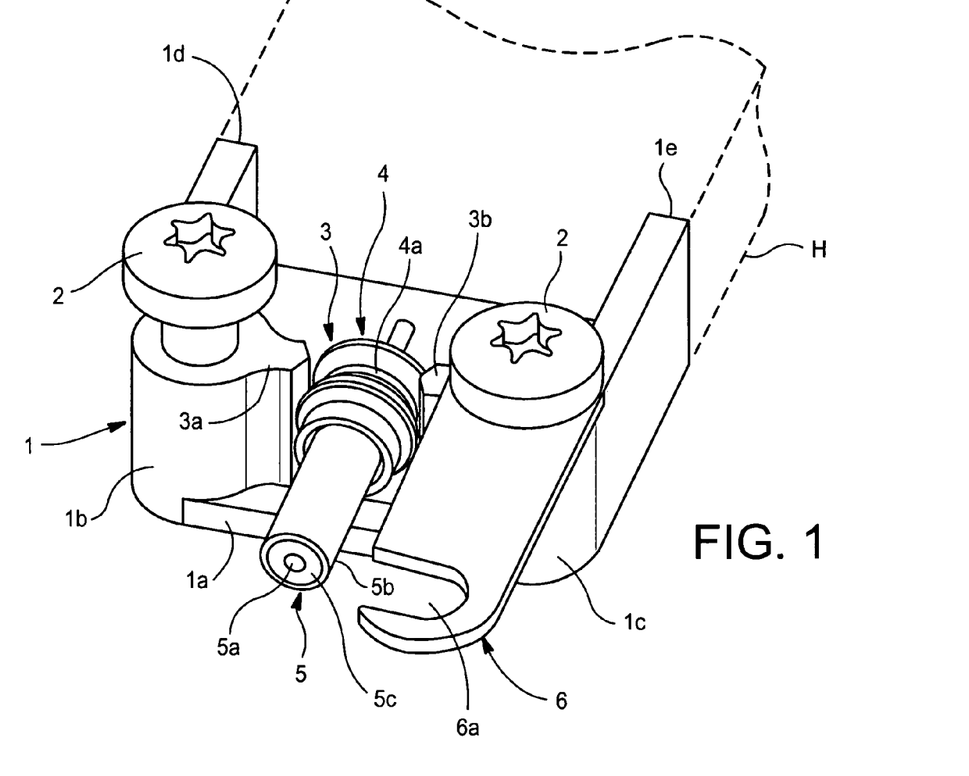
FIG. 1: shows a perspective view of a first embodiment of the connecting apparatus according to the invention, with a coaxial cable inserted.

The first embodiment of the coaxial connecting apparatus according to the invention, as illustrated in FIG. 1, has a coupling element 1 which is preferably part of a metallic housing and is formed integrally with the housing, as a casting. The coupling element is composed, for example, of aluminum or zinc and the housing is, for example, a housing of a phase shifter that is used in radio-frequency antenna arrangements, which produces a phase shift in the radiation of the individual antenna elements in mobile radio antennas. The coupling element has a cap area 1a, from which two flange sections 1b and 1c extend upwards. Walls 1d and 1e, which form parts of the housing and extend to further flange sections, are in each case adjacent to the flange sections. The flange sections 1b and 1c each have a hole into which appropriate threaded bolts 2 are screwed. A holder 3 is formed between the flanges 1b and 1c and is bounded on the left and right by two projections 3a and 3b, which are each adjacent to one flange section. A connecting sleeve 4 is inserted into the holder from above through the insertion opening which is formed between the flanges. The connecting sleeve is composed of a conductive material, for example of tinned brass or nickel silver, and is profiled in the form of a groove 4a, with the projections 3a and 3b extending into the groove, thus preventing the sleeve from being removed from the holder 3 in the axial direction. A coaxial cable 5 with an inner conductor 5a, an outer conductor 5b and a dielectric 5c located between them is inserted into the sleeve. In this case, the outer conductor is preferably soldered in the sleeve 4. The holder 3 as well as the sleeve 4 are shaped so as to produce defined contact points between the sleeve and the holder, so that there is a defined current flow from the outer conductor 5b to the housing, as will be described in more detail in the following text.

A clamping device in the form of a clamping bar 6, which is shown in the open, non-clamping position in FIG. 1, is located on the upper face of the flange sections 1b and 1c. At one end, the clamping bar has a hole (which cannot be seen in FIG. 1), into which a screw 2 is inserted. The screw is screwed into the flange 1c until the clamping bar is fixed between the lower face of the screw 2 and the upper face of the flange 1c. However, the screw has not been tightened in FIG. 1, so that the clamping bar 6 can still rotate about the axis of the screw 2. At its front end, the clamping bar 6 has a cutout 6a which is open towards one edge of the clamping bar. The cutout 6a forms an engagement section which, by swiveling the clamping bar 6 towards the flange section 1b, engages in the external thread on a further screw 2 which has been inserted into the hole in the flange section 1b. In this engaged position, the clamping bar 6 extends over the holder 3. When the two screws 2 are subsequently tightened, the clamping bar presses on the sleeve at two defined support points. The sleeve is thus pressed firmly against the contact points in the holder, thus making a good conductive contact between the sleeve and the contact points in the holder.

The clamping bar may be composed of conductive material, for example of spring bronze, thus allowing two further electrical contact points between the sleeve and the clamping bar, and thus the housing. Alternatively, the clamping bar may also be composed of non-conductive or non-metallic material, for example of glass fiber reinforced plastic, so that no further electrical contact points are provided between the sleeve and the clamping bar. It is also possible for the clamping bar to be composed of metallic material but to be isolated from the sleeve and/or from the flange sections. The connecting apparatus shown in FIG. 1 allows the coaxial cable 5 to be inserted easily into the coupling element 1 by means of a joining movement at right angles to the axial direction of the cable, thus preventing damage to the inner conductor 5a. Furthermore, a detachable electrical contact can be ensured in a simple manner between the outer conductor 5b of the cable 5 and the coupling element 1.

Figure 2:
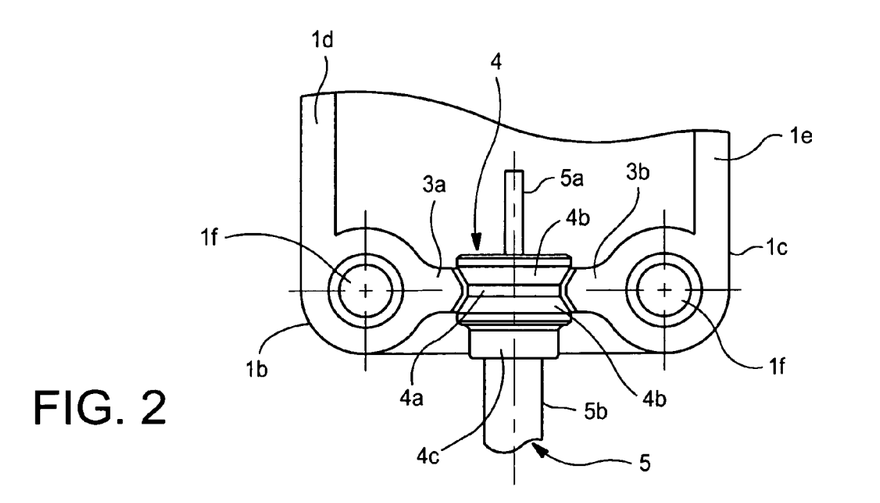
FIG. 2: shows a plan view of the apparatus shown in FIG. 1, without a clamping device.

FIG. 2 shows a plan view of the apparatus shown in FIG. 1, with the upper screws 2 and the clamping bar 6 having been omitted. This shows in particular that the groove 4a in the sleeve 4 has two opposite, circumferential conical flanks 4b, in which the front rounded edges of the projections 3a and 3b engage. In this case, the edges never make contact with the flanks since the defined contact points (which cannot be seen in FIG. 2) between the sleeve and the holder result in the sleeve being self-centered in the holder, so contact with the sleeve is made exclusively at the defined contact points. The projections are thus used only for rough fixing, in order that the sleeve can easily be fitted and does not escape axially before the screws 2 are tightened in order to fix the clamping bar. The figure also shows that the sleeve 4 has a front cylindrical section 4c, in which the outer conductor 5b of the coaxial cable 5 is inserted. The openings 1f in the flange sections 1b and 1c can also be seen.

Figure 3:
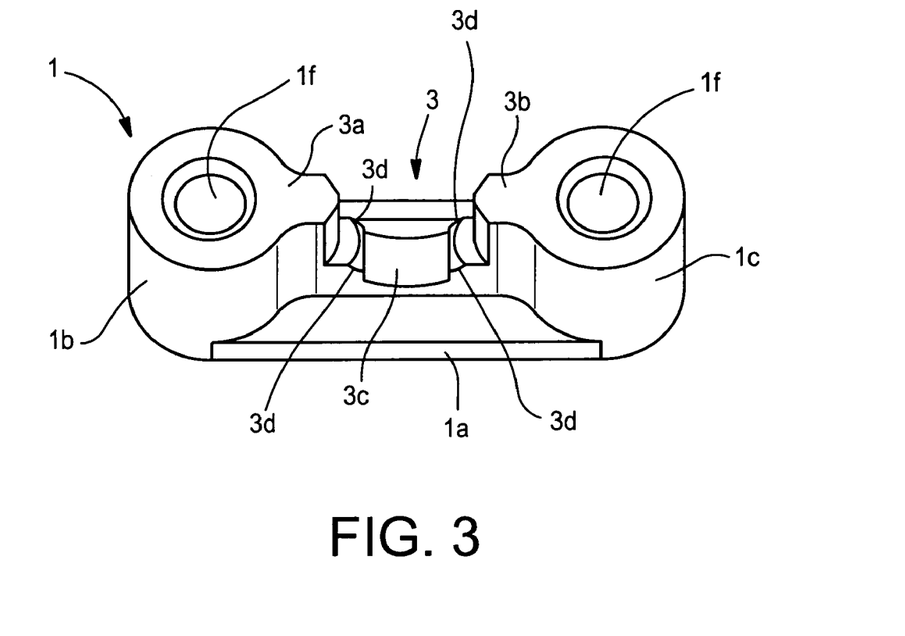
FIG. 3: shows a perspective view of the holder for the connecting apparatus shown in FIG. 1, without a sleeve inserted.
Figure 4:
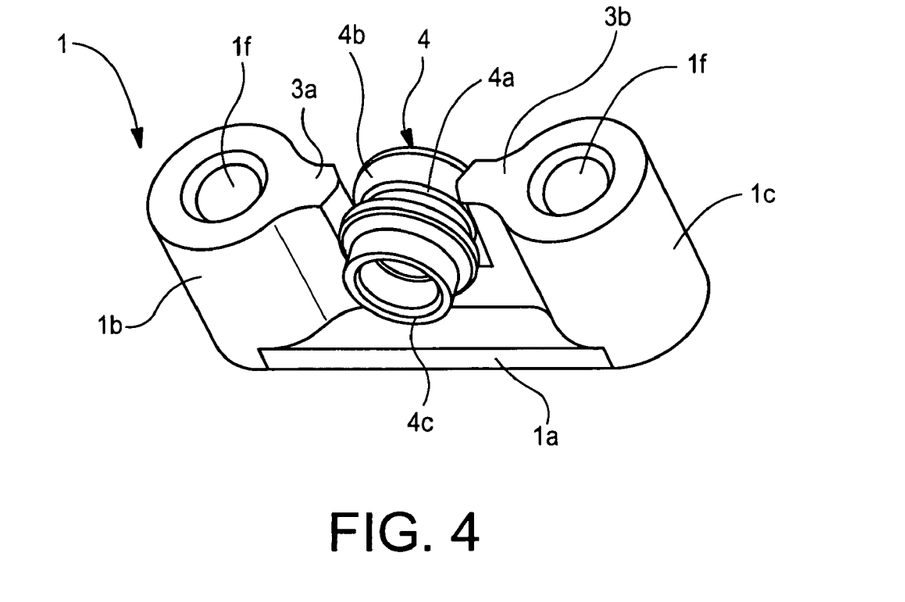
FIG. 4: shows a perspective view of the holder for the connecting apparatus shown in FIG. 1, with a sleeve inserted.

FIGS. 3 and 4 show perspective views of the area of the coupling element 1 which forms the holder. FIG. 3 in this case shows a view without a connecting sleeve 4 inserted while, in contrast, FIG. 4 shows the connecting sleeve inserted into the holder 3. The detailed shape of the holder can be seen from FIG. 3. The holder has a circular cutout 3c in a lower area, adjacent to which there are four oblique cylindrical surfaces 3d. Two cylindrical surfaces are in each case provided on the left and right sides of the cutout 3c. The cylindrical surfaces 3d on the right side in this case rest on a cylinder whose diameter is 4 mm, with the cylinder axis being inclined at +45° to a vertical axis, which is in the vertical direction on the cap 1a, and lying on a plane which runs centrally through the two flange sections 1b and 1c. The left cylindrical surfaces 3d rest analogously on a cylinder which is inclined at −45° to the vertical axis. The conical surfaces 4b of the groove 4a rest on the cylindrical surfaces 3d, with the conical surfaces being inclined at +30° or −30° to an axis which is at right angles to the axial axis of the sleeve 4. Four point contacts are in this way formed between the sleeve 4 and the coupling element 1 by the interaction of the conical surfaces 4b with the cylindrical surfaces 3d. The two front cylindrical surfaces 3d in this case rest on the outside of the housing (which is not shown) while, in contrast, the rear two cylindrical surfaces 3d rest on the inside of the housing. The outer conductor current which is flowing on the inside of the outer conductor thus flows away via the cylindrical surfaces of the inside of the housing while, in contrast, the outer conductor current on the outside of the outer conductor flows away via the cylindrical surfaces on the outside of the housing.

Figure 5A:
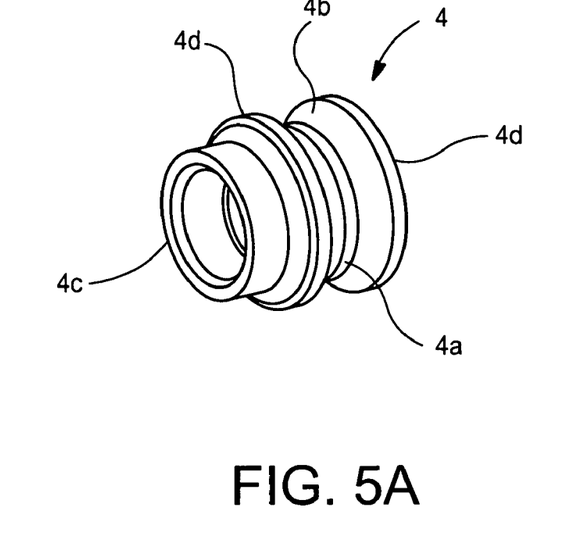
FIGS. 5A and 5B: show two perspective views of the connecting sleeve used in the apparatus shown in FIG. 1.
Figure 5B:
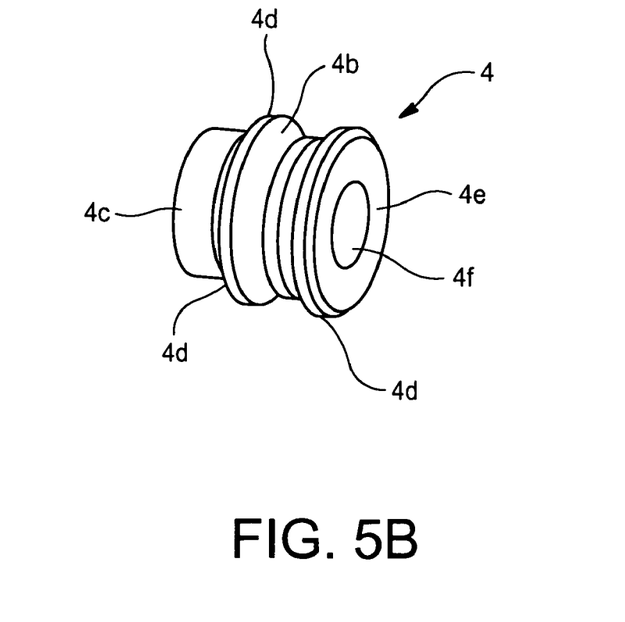

FIGS. 5A and 5B once again show perspective views of the connecting sleeve 4 according to the first embodiment of the invention, which has just been described. This shows in particular that there are narrow cylindrical sections 4d adjacent to each of the conical sections 4b of the groove 4a. Once the sleeve has been mounted in the connecting apparatus by means of the clamping bar 6 described above, the clamping bar presses on a touching point on each of the narrow sections 4d. FIG. 5B also shows that the end 4e of the sleeve which is opposite the cylindrical section 4c forms a planar surface with an opening 4f, with the dielectric 5c being located in the opening 4f when a coaxial cable 5 is inserted. However, it is also possible for the dielectric not to extend as far as the opening 4f, but in fact to end in the area of the groove 4a.

Figure 6:
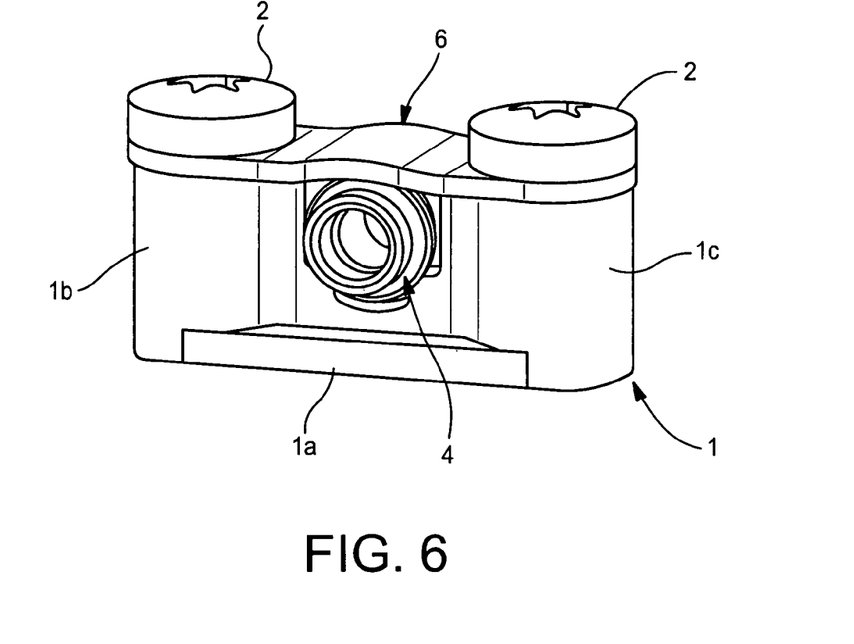
FIG. 6: shows a perspective view of a second embodiment of the connecting apparatus according to the invention.

FIG. 6 shows a perspective view of a second embodiment of the connecting apparatus according to the invention with a sleeve 4 which has been inserted in it and is clamped firmly with the aid of the clamping bar 6. The embodiment in FIG. 6 corresponds essentially to the first embodiment, with the difference that the cutout 6a has been replaced by a hole (which cannot be seen) with a closed edge, so that the clamping bar now has two holes with a continuous border, into each of which screws 2 are inserted. In FIG. 6, the screws have been tightened so that a clamping bar is producing a clamping effect. The figures show in particular that the clamping bar is curved in the area of its contact points on the connecting sleeve 4. This elastic deformation compensates for all the changes in the contact conditions, for example changes resulting from thermal expansion. High contact forces are thus ensured. The plastic deformation of the bar furthermore results in good compensation for manufacturing tolerances.

Figure 7:
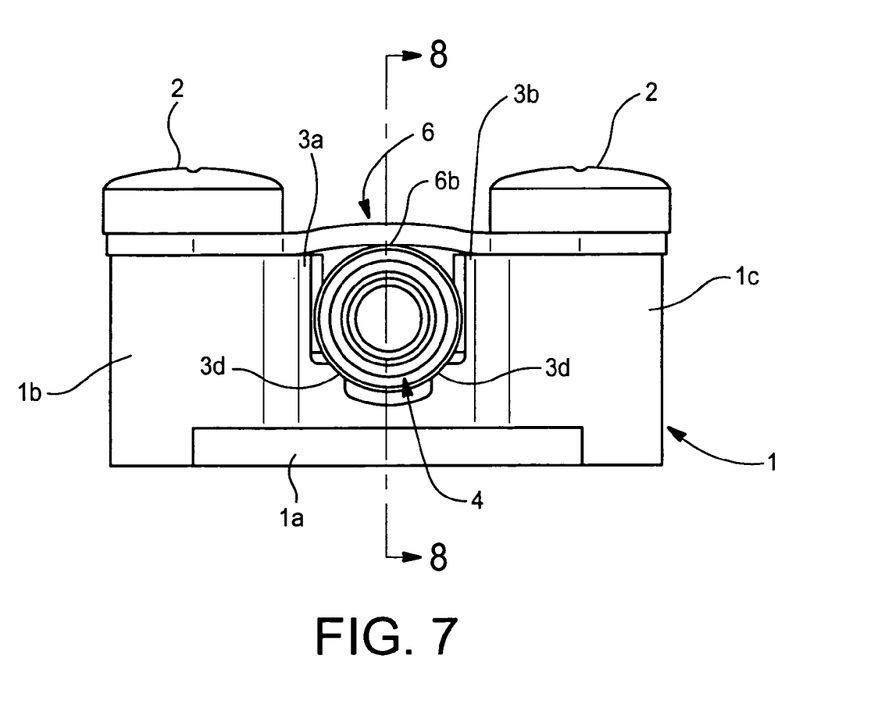
FIG. 7: shows a plan view from the front of the apparatus shown in FIG. 6.

FIG. 7 shows a plan view from the front of the apparatus shown in FIG. 6. A total of six contact points 3*b* and 6*b* are provided on the sleeve, with FIG. 7 showing the front two contact points 3*d* towards the holder 3 as well as the front upper contact point 6*b* towards the clamping bar 6. The contact points are arranged symmetrically about the vertical axis A, which passes through the sleeve center.

Figure 8:
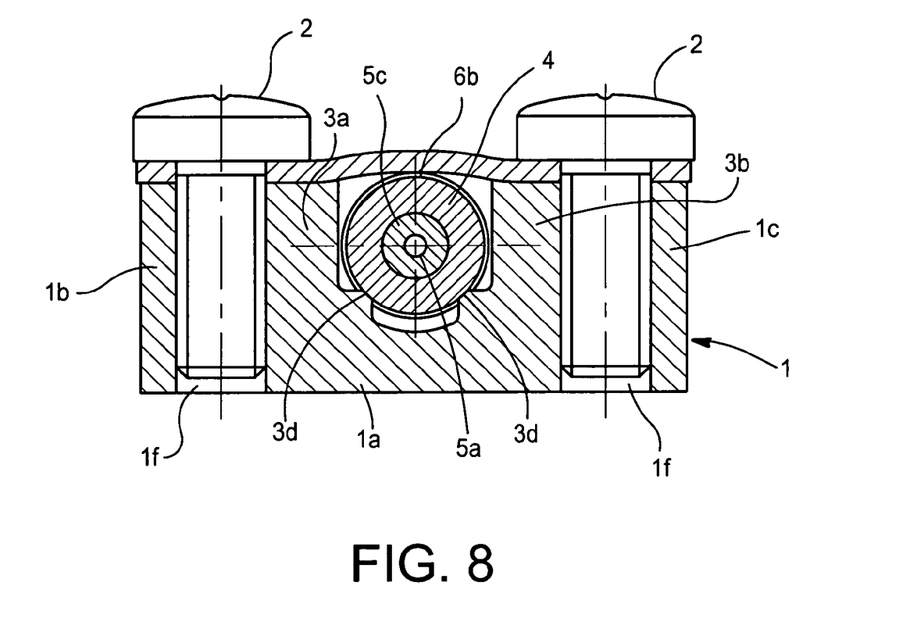
FIG. 8: shows a section view through the apparatus shown in FIG. 6, with a coaxial cable inserted, along a plane which is at right angles to the axial axis of the coaxial cable and runs centrally through the holder.
Figure 9:
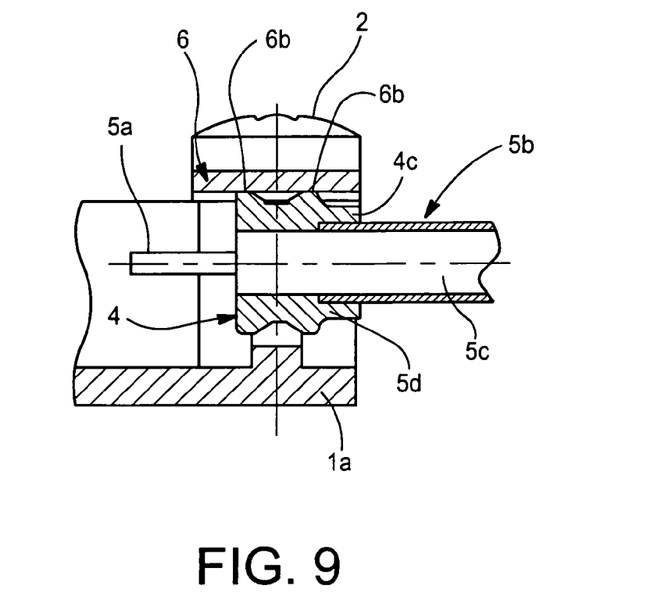
FIG. 9: shows a section view at right angles to the section shown in FIG. 8, along the inner conductor of the inserted coaxial cable.

FIG. 8 shows a section through the apparatus shown in FIG. 7 with a coaxial cable 5 inserted, along a plane which runs at right angles to the axial direction of the sleeve through corresponding contact points 6*b* and 3*d*. The figure shows that the sleeve is relatively thick in this area in comparison to the inner conductor 5*a* and the dielectric 5*c*. The figure also shows that there is no longer a coaxial outer conductor located in this area, that is to say the insulation has been stripped off the outer conductor in this area. This is also once again evident from FIG. 9, which shows a longitudinal section from FIG. 8 along the axial direction of the sleeve and of the coaxial cable. As can be seen, the front end 5*d* of the coaxial outer conductor 5*c* does not extend through the entire sleeve 4, but in fact ends shortly after the cylindrical section 4*c* of the sleeve. The outer conductor is soldered to the sleeve in the area in which the coaxial outer conductor 5*b* is held in the section 4*c*. The soldering can be carried out before the sleeve is inserted into the coupling element. However, it is also possible for the sleeve to be first of all inserted into the coupling element 1, and only then to be firmly soldered to the outer conductor. FIG. 9 also shows that the clamping bar 6 presses on the sleeve 4 at the two upper, axially offset contact points 6*b*.

Figure 10:
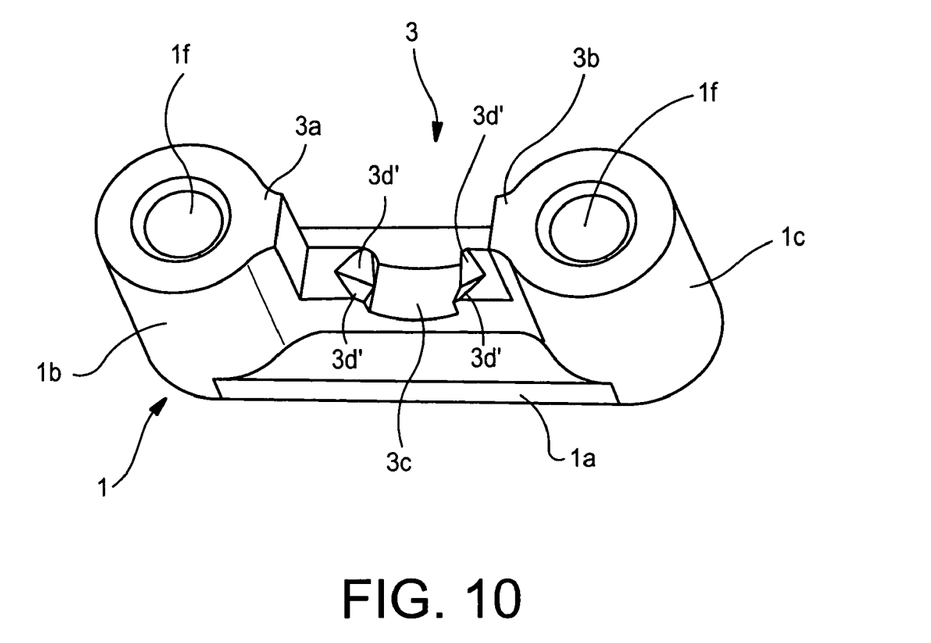
FIG. 10: shows a perspective view of a holder for a third embodiment of the apparatus according to the invention, without a sleeve inserted.
Figure 11:
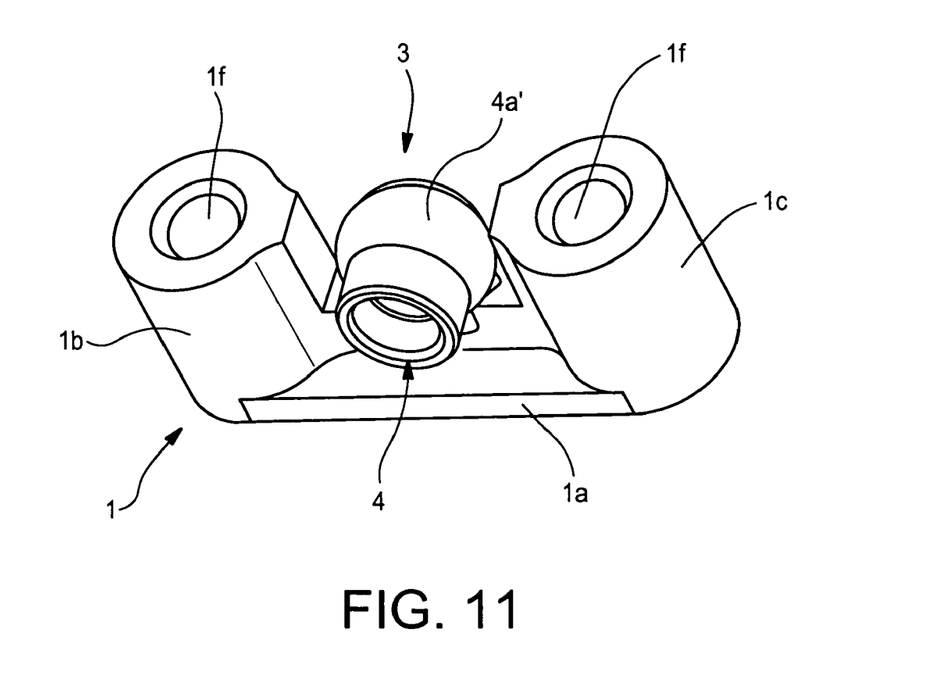
FIG. 11: shows a perspective view of the holder as shown in FIG. 10, with a sleeve inserted.

FIGS. 10 and 11 show two perspective views of a further embodiment of a holder 3 used in the apparatus according to the invention. FIG. 10 shows a view of the holder for the coupling element without a sleeve 4 inserted while, in contrast, FIG. 11 shows the connecting sleeve positioned in the holder in the coupling element. The embodiment shown in FIGS. 10 and 11 differs from the previous embodiments in that the connecting sleeve 4 has a circumferential profiled ring 4*a*' instead of a profiled groove 4*a*, which is inserted into corresponding notches, with the oblique surfaces of the notches forming four contact points 3*d*' between the connecting sleeve 4 and the coupling element 1. Two contact point pairs are formed analogously to the previous embodiments, with the contact points of each pair being axially offset with respect to one another. In particular, the front contact points are located on the outside of a housing (which is not shown), and the rear contact points are located on the inside of a housing (which is not shown). A further difference from the previous embodiments is that the projections 3*a* and 3*b* are not rounded, but each have a planar, vertical termination.

Figure 12A:
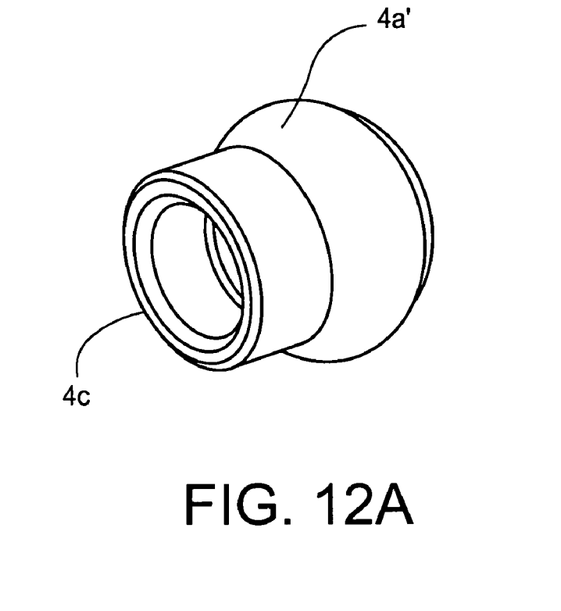
FIGS. 12A and 12B: show perspective views of the sleeve shown in FIG. 11.
Figure 12B:
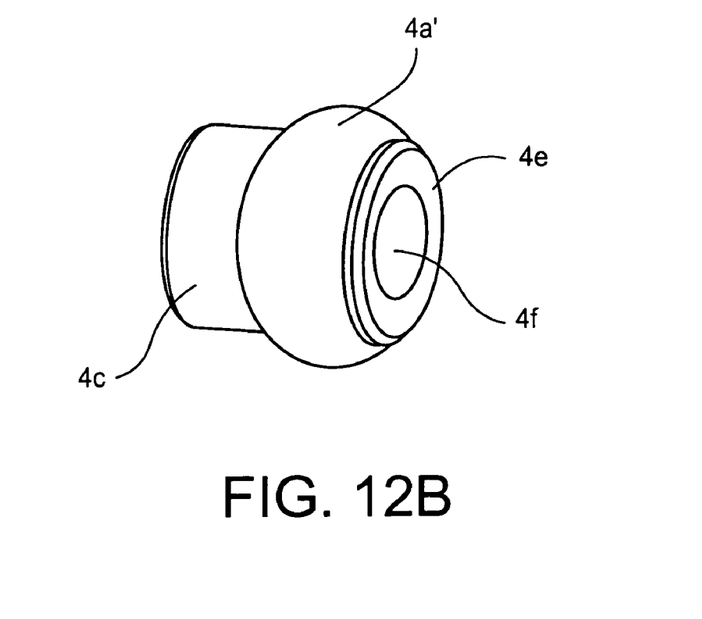

FIGS. 12A and 12B show two perspective views of the connecting sleeve 4 shown in FIG. 11. As can be seen, the profiled ring 4*a*' essentially forms a domed area, which is adjacent to a cylindrical end 4*c* of the sleeve 4. The domed area ends on the opposite side of the cylindrical end 4*c* with a planar surface 4*e* in which an opening 4*f* is located, in which the dielectric 5*c* of the coaxial cable 5 is positioned. In this embodiment, it is also possible for the dielectric not to extend as far as the opening 4*f*, but in fact to end in the area of the groove 4*a*.

Figure 13:
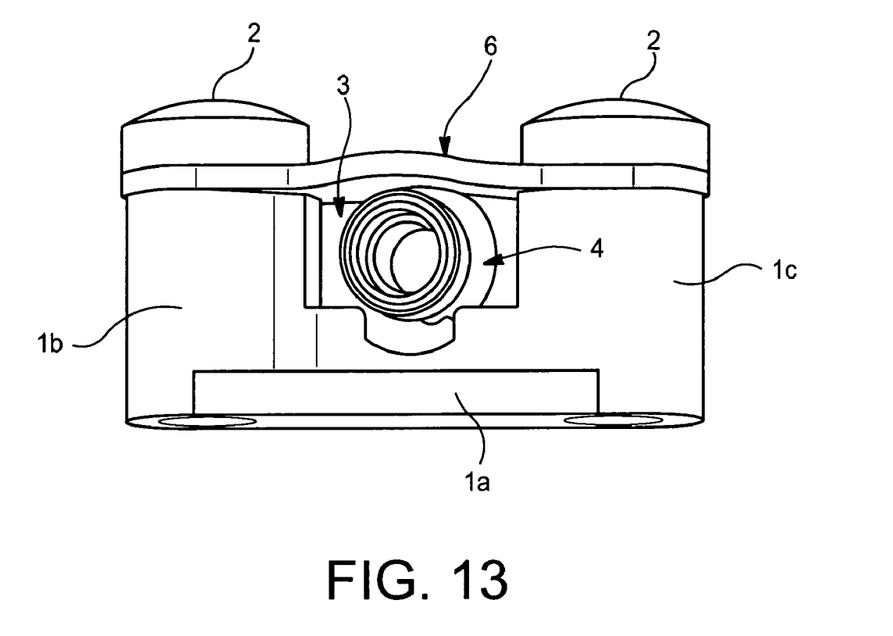
FIG. 13: shows a perspective view of the third embodiment of the connecting apparatus according to the invention, with a firmly clamped sleeve.
Figure 14:
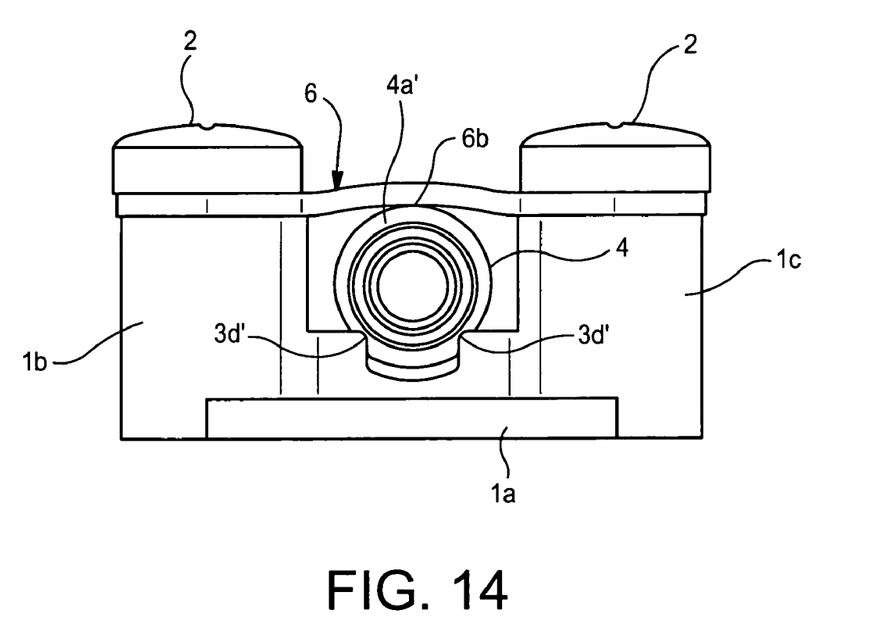
FIG. 14: shows a plan view from the front of the apparatus shown in FIG. 13.

FIG. 13 shows a perspective view of a connecting apparatus with the coupling element shown in FIGS. 10 and 11, with the sleeve 4 being clamped in the holder 3 in the coupling element by means of the profiled ring 4*a*' via a clamping bar 6. The clamping bar in this case corresponds to the clamping bar used in the embodiments in FIGS. 6 to 9. As can be seen, the clamping bar has been elastically deformed in order to produce the clamping effect in its center. In this case, the clamping bar presses on the profiled ring 4*a*' on the connecting sleeve 4 at a single contact point 6*b*. This can also be seen, in particular, from FIG. 14, which shows a plan view from the front of the apparatus shown in FIG. 13. As can be seen, the profiled ring 4*a*' rests at its uppermost point 6*b* on the deformed clamping bar 6, and, furthermore, the profiled ring 4*a*' rests on the contact points 3*d*' in the notches. There are therefore four contact points between the profiled ring and the holder 3, and one contact point between the profiled ring and the clamping bar 6.

Figure 15:
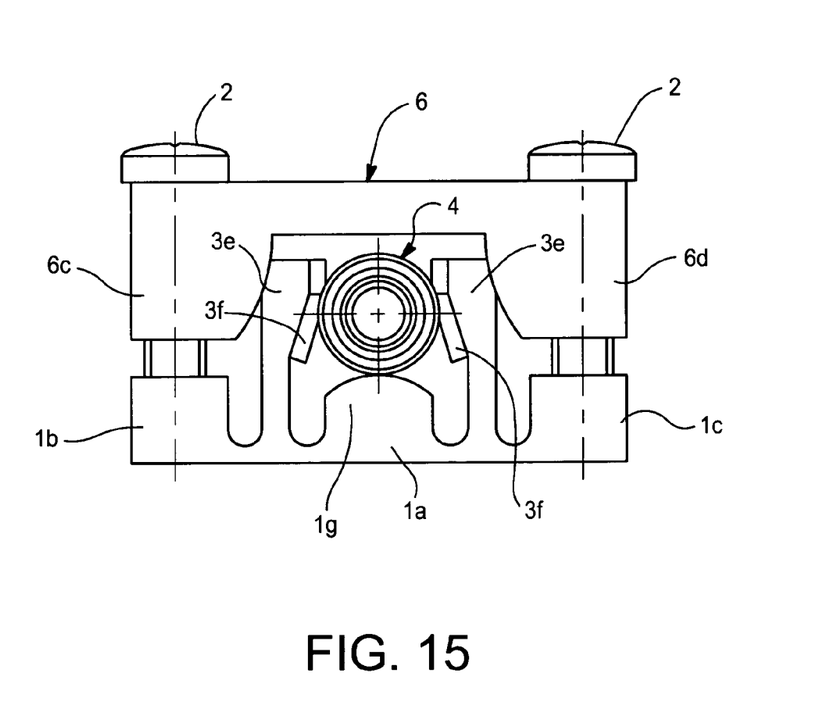
FIG. 15: shows a plan view from the front of a fourth embodiment of the connecting apparatus according to the invention.

FIG. 15 shows a plan view from the front of a further embodiment of the connecting apparatus according to the invention. A connecting sleeve 4 with a profiled groove 4*a* is used analogously to the embodiments in FIGS. 1 to 9. In contrast to those embodiments, the clamping forces are, however, produced by two clamping jaws 3*e* in the holder 3 with wedges 3*f*, which are arranged on the inside of the jaws, engaging in the groove thus, once again, producing defined contact points. The clamping bar in this case has two flange sections 6*c* and 6*d* with inner surfaces in the form of wedges on the lower face, which inner surfaces press against the jaws 3*e* when the screws 2 are tightened in the flanges 1*b* and 1*c*. The cap 1*a* furthermore has a protrusion 1*g* with a rounded surface, on which the narrow cylindrical sections 4*d* of the sleeve 4 rest, thus forming a further contact with the housing. The embodiment shown in FIG. 15 may also be combined with the sleeve from the embodiment shown in FIGS. 10 to 14. In this case, the clamping jaws 3*e* have notches instead of the wedges 3*f*, on which the profiled ring 4*a*' of the sleeve 4 rests.

The invention claimed is:

1. An apparatus for connecting a coaxial cable having an outer conductor and an axial axis to a housing, the apparatus comprising:

a connecting element having an axial axis, the connecting element receiving the coaxial cable and conductively connecting to the outer conductor of the coaxial cable, with the axial axis of the inserted coaxial cable being parallel to the axial axis of the connecting element;

a coupling element conductively connected to the housing, the coupling element comprising a holder defining an insertion opening, said connecting element being inserted into the coupling element holder insertion opening in a direction substantially at right angles to the axial axis of the connecting element;

the connecting element and the holder being shaped such that the connecting element which has been inserted into the holder touches at least one contact point in the holder thereby making a conductive contact;

the coupling element further comprising a clamping device which detachably firmly clamps the connecting element in a clamping position in the holder, the clamping device exerting pressure on the connecting element in the clamping position and pressing the connecting element against the at least one contact point.

2. The apparatus according to claim 1, wherein plural contact points are provided, with some of the plural contact points being offset with respect to the other ones of plural contact points in the axial direction of the connecting element.

3. The apparatus according to claim 2, wherein the housing has an inside and an outside, some of the plural contact points are located on the inside of the housing, and others of the plural contact points are located on the outside of the housing.

4. The apparatus according to claim 1, wherein the at least one contact point comprises plural contact points arranged symmetrically about an axis of symmetry which corresponds to the direction in which the connecting element is inserted into the holder.

5. The apparatus according to claim 4, wherein, seen in the axial direction of the connecting element, the plural contact points are offset with respect to one another through an angle of between 90° and 120°.

6. The apparatus according to claim 1, wherein the at least one contact point comprises at least one contact point pair comprising two contact points aligned with respect to one another in the axial direction of the connecting element.

7. The apparatus according to claim 1, wherein the holder includes at least one flat element, and wherein the connecting element comprises a sleeve with a circumferential profiled groove, said profiled groove interacting with the at least one flat elements in the holder of the coupling element such that the at least one contact point comprises points of the holder at least one flat element contacting points of profiled groove.

8. The apparatus according to claim 7, wherein the holder defines a cutout, and the profiled groove is shaped as a wedge with conical flanks, with the conical flanks of the profiled groove resting on correspondingly arranged cylindrical surfaces in the holder cutout.

9. The apparatus according to claim 8, wherein the sleeve has an axial axis, and wherein the conical flanks of the profiled groove are inclined at 30° angle with respect to the axial axis of the sleeve.

10. The apparatus according to claim 8, wherein the cylindrical surfaces comprises flat sections on at least one cylinders which are inclined with respect to the axis in whose direction the connecting element is inserted into the insertion opening in the holder at a 45° angle, with the axis of the cylinder or cylinders lying on a plane at right angles to the axial axis of the sleeve.

11. The apparatus according to claim 7, wherein the holder has two opposite projections, which engage in the profiled groove in the connecting element which has been inserted into the holder.

12. The apparatus according to claim 1, wherein the connecting element a metallic turned part comprising tinned brass and/or nickel silver.

13. The apparatus according to claim 1, wherein the coupling element is cast formed integrally with the housing.

14. The apparatus according to claim 1, wherein the outer conductor of the coaxial cable is soldered in the connecting element.

15. A housing for a phase shifter for an antenna arrangement, comprising:
 a connecting element for connecting to an antenna coaxial cable having an outer conductor and an axial axis, said connecting element having an axial axis, the connecting element receiving the coaxial cable and conductively connecting to the outer conductor of the coaxial cable, with the axial axis of the inserted coaxial cable being parallel to the axial axis of the connecting element;
 a conductively connected coupling element comprising a holder for insertion of the connecting element, the coupling element holder defining an insertion opening, said connecting element being inserted into the coupling element holder insertion opening in a direction which is essentially at right angles to the axial axis of the connecting element;
 the connecting element and the holder for the coupling element being shaped such that the connecting element which has been inserted into the holder touches at least one contact point in the holder thereby making a conductive contact;
 the coupling element further comprising a clamping device which detachably firmly clamps the connecting element in a clamping position in the holder, the clamping device on the insertion opening exerting pressure on the connecting element in the clamping position and pressing the connecting element against the at least one contact point.

16. The housing according to claim 15, wherein some of the contact points of the connecting apparatus are arranged adjacent to the inside of the housing, and the other contact points of the connecting apparatus are arranged adjacent to the outside of the housing.

* * * * *